Nov. 18, 1941.  W. F. ROGERS  2,263,473
BROILER OVEN
Filed March 24, 1941  2 Sheets-Sheet 1
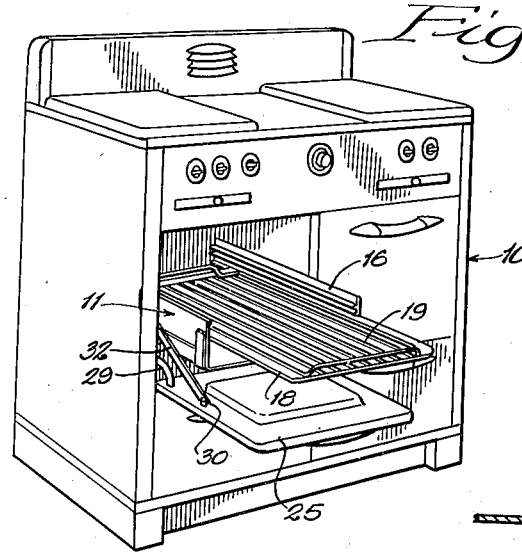
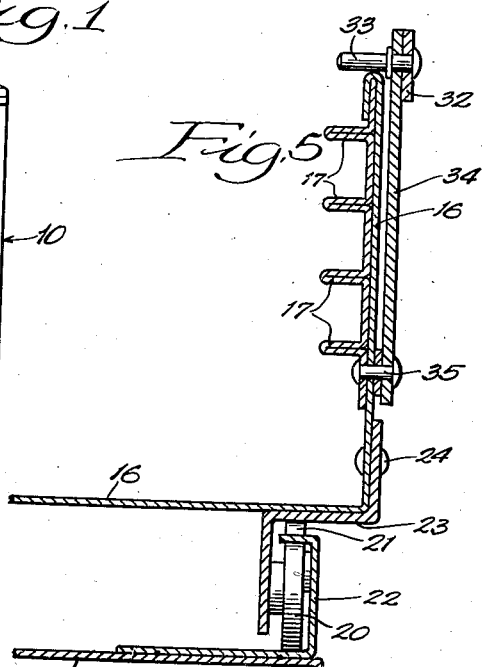
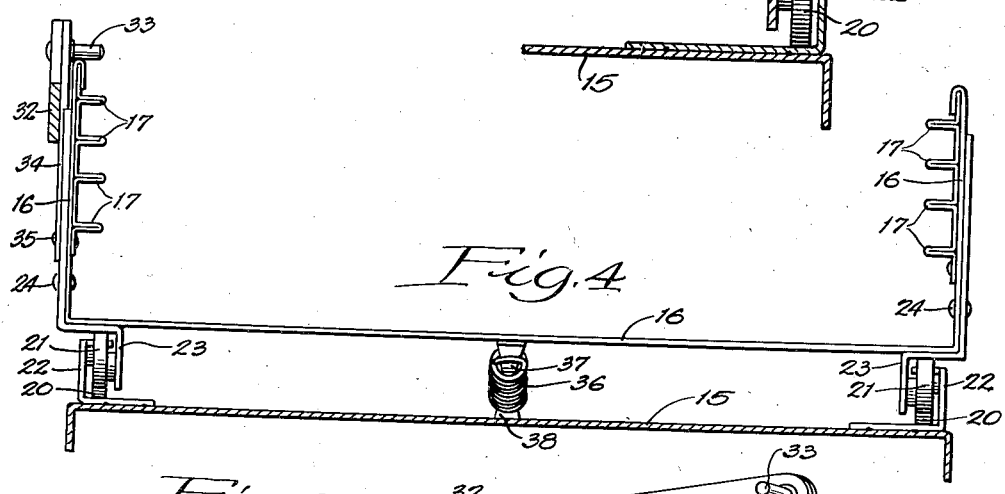
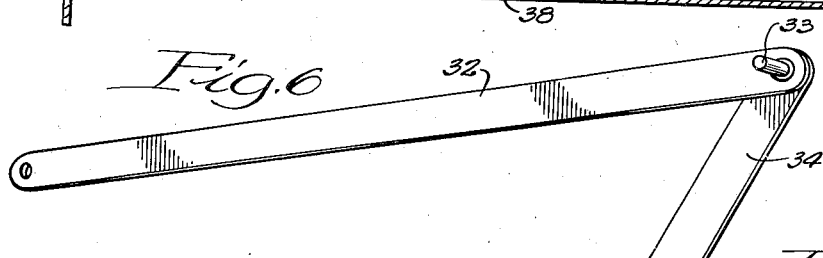
Inventor:
Walter F. Rogers
By Soans Pond & Anderson
Attorneys.

Nov. 18, 1941. W. F. ROGERS 2,263,473
BROILER OVEN
Filed March 24, 1941 2 Sheets-Sheet 2

Inventor:
Walter F. Rogers,
By Evans Pond & Anderson,
Attorneys.

Patented Nov. 18, 1941

2,263,473

UNITED STATES PATENT OFFICE 2,263,473

BROILER OVEN

Walter F. Rogers, Oak Park, Ill., assignor to Crown Stove Works, a corporation of Illinois Application March 24, 1941, Serial No. 384,876

3 Claims. (Cl. 126—340)

This invention relates to the general art of cooking stoves and ranges, having reference more particularly to improvements in the broiler ovens which usually form a part of such stoves and ranges.

More specifically, the present invention relates to broiler ovens of a broadly known type wherein a drawer, rack or the like that supports the broiler grid or other cooking utensil is slidably mounted in the oven and is operatively connected to the oven door, so that, when the door is opened the drawer or rack is drawn partly out of the oven where the cooking utensil is more accessible, and, when the door is closed, is moved to normal position in the oven.

Door-actuated devices of this type for withdrawing and returning the drawer or rack heretofore employed are more or less complicated and cumbersome; and the object of this invention is to provide a very simple, inexpensive and efficient broiler oven accessory that will occupy only otherwise unused space in the oven, will present no interference with the opening and closing movements of the oven door, and can be easily detached from the door to permit full removal of the broiler drawer or rack, when necessary for cleaning the same and/or the oven.

A practical and preferred embodiment of the invention is illustrated in the accompanying drawings, in which—

Fig. 1 is a perspective view of a gas range embodying my improvement, showing the oven door fully opened, and the broiler drawer and parts carried thereby partly withdrawn from the oven.

Fig. 4 is a transverse section taken on the line 4—4 of Fig. 2, omitting the cooking utensils carried by the slidable broiler drawer.

Fig. 5 is an enlarged section taken on the line 5—5 of Fig. 3.

Fig. 6 is a perspective detail of the link mechanism for moving the drawer.

Figure 2:
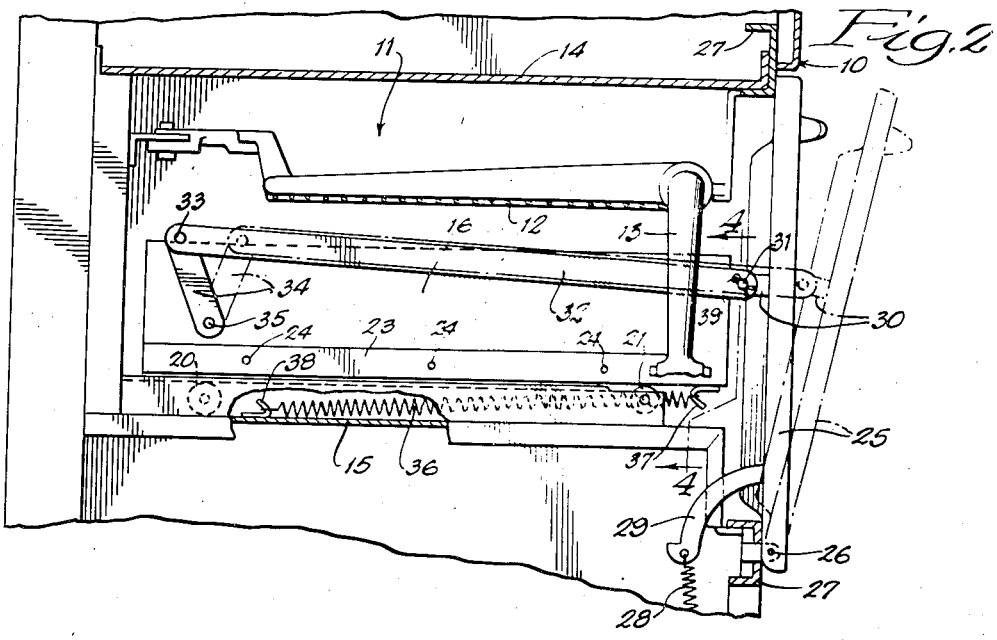
Fig. 2 is a vertical front to rear section, showing in full lines the door closed, and in dot and dash lines a partly open position of the door which takes up the lost motion in the drawer withdrawing means.

Referring to the drawings, 10 designates as an entirety a modern type of cooking stove or range, in one side of which is a broiler oven, designated as a whole by 11. In the upper portion of the oven is a burner 12 supplied with gas through a manifold 13. 14 designates the top wall of the oven, and 15, the bottom wall. Slidable inwardly and outwardly of the oven is a broiler drawer 16, the side walls of which are equipped, as usual, with spaced ledges 17 that support the longitudinal edges of a broiler pan 18, in which latter is seated the removable broiler grid 19. The drawer 16 is slidably supported on the oven bottom 15 through the agency of a pair of rollers 20 and 21 on each side. The foremost rollers 21 are journaled on the inner sides of a pair of inwardly facing channel bars 22 that are spot-welded or otherwise secured on the side portions of the oven bottom 15, and the rear rollers 20 are similarly journaled on the lower depending flanges of a pair of Z-bars 23 that are riveted at 24 to the lower corner portions of the drawer 16; the arrangement being such that the rollers 20 and 21 on each side are in the same vertical plane.

25 designates the oven door which is hinged at 26 to the bottom member of the usual frame 27 of the front opening of the oven. A spring 28 anchored at its lower end to a fixed member of the stove frame and at its upper end to a curved arm 29, rigid with the door 25, cushions the down movement of the door and assists its up movement; such a spring in various forms being a common equipment of oven doors.

Figure 3:
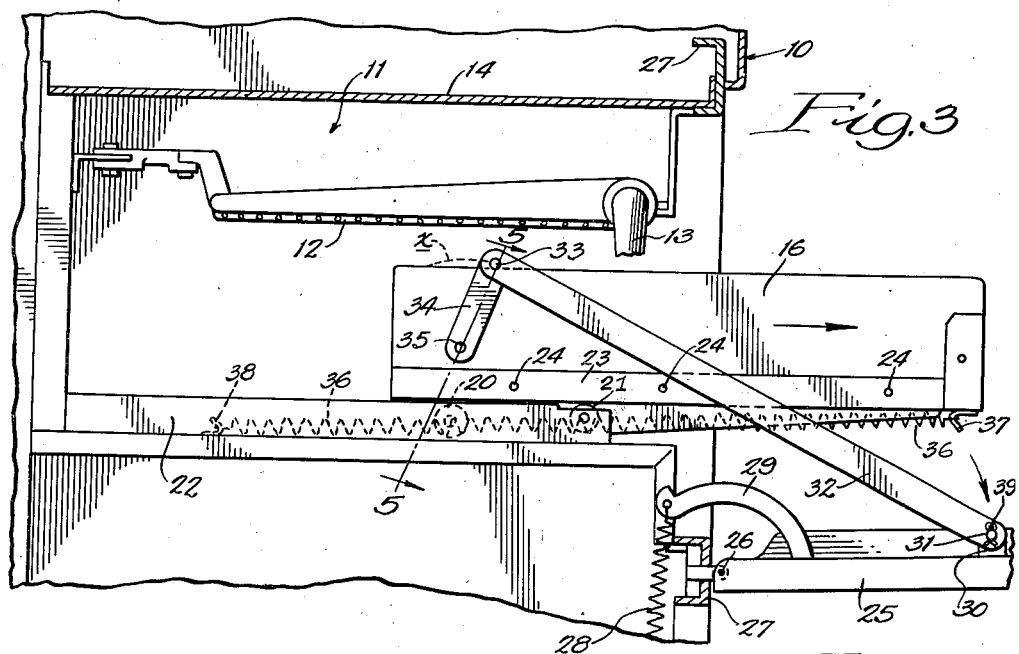
Fig. 3 is a view similar to Fig. 2, but showing the positions of the parts when the door has been fully opened.

Describing now those features wherein the present invention mainly lies, on the inner face of the oven door 25 is a lug 30, to which is connected by a pivot pin 31 the outer end of a straight bar link 32. The other end of link 32 is connected by a pivot pin 33 to the upper end of an upstanding shorter link 34 that is itself pivoted at 35 to the outer side of a side wall of the drawer 16. It will be observed by reference to Figs. 4 and 5 that the upper pivot pin 33 is long enough to overhang the top edge of the side wall of drawer 16 to which the link 34 is pivoted. Hence, when the door 25 is opened, the pivot pin 33 moves idly through a short arc, indicated by dotted lines at X in Fig. 3, above the top edge of the side wall of the drawer 16, this idle movement taking place in a forward direction when the door 25 is moving from the full line (closed) position to the dot and dash line position shown in Fig. 2. When the door 25 is closed, the same idle movement of the pin 33 takes place in the opposite direction through the latter part of the closing movement. From this it will be seen that the link 32 does not move the drawer 16 in either direction until this lost motion has been taken up. The reason for this is to prevent any collision of the forward end of the drawer with the door during the opening movement of the latter. To prevent any collision of the door with the front end of the drawer during the first part of the closing movement of the door, I employ a pull spring 36 that is anchored at its forward end to a hook 37 on the lower side of the bottom wall of the drawer and at its rear end to a hook 38 on the bottom wall 15 of the oven. This spring 36 starts the drawer 16 back the instant the door 25 begins its closing movement, preventing collision of the door with the front end of the drawer and effecting the return movement of the latter. As shown in Fig. 4, this spring 36 is preferably located centrally of the width of the oven and drawer.

The link 32 is preferably maintained engaged with the pin 31 by a cottor pin 39. When it may be desired to entirely remove the broiler drawer to scour the latter and/or the oven, all that has to be done is to pull out the cotter pin 39, slip the link 32 off the pin 31, and pull the spring 36 off the hook 37. When the drawer is replaced, the mere reversal of these operations reestablishes the operative connection of the door and spring to the drawer.

I claim:

1. In a broiler oven device of the class described, the combination of a slidable broiler drawer, an oven door hinged at its lower edge, a relatively short swinging link pivoted at one end on said drawer, a relatively long link pivoted at one end to said door above the hinged edge of the latter and at its other end to the other end of said swinging link, said links cooperating to form a lost motion connection of said door to said drawer for withdrawing the latter and a spring urging said drawer inwardly of the oven.

2. In a broiler oven device of the class described, the combination of a slidable broiler drawer, an oven door hinged at its lower edge, a relatively short swinging link pivoted at one end to said drawer, a relatively long link pivoted at one end to said door above the hinged edge of the latter and at its other end to the other end of said swinging link, means for limiting the swinging movement of said swinging link with respect to the drawer in both directions, and a pull spring urging said drawer inwardly of the oven.

3. In a broiler oven device of the class described, the combination of a slidable broiler drawer, an oven door hinged at its lower edge, a relatively short swinging link pivoted at its lower end on a side wall of said drawer and of a length such that in all working positions it extends above the top edge of said side wall, a relatively long link pivoted at its front end to said door above the hinged edge of the latter, a pivot pin connecting the rear end of said long link to the upper end of said short link and having a portion overhanging the top edge of said side wall, the overhanging portion of said pivot pin and said top edge cooperating to render said long link effective to withdraw said drawer when the oven door is opened, and a pull spring detachably connected at its forward end to said drawer and at its rear end to the oven bottom and urging said drawer inwardly of the oven.

WALTER F. ROGERS.